April 1, 1924.
E. E. L. BOYER ET AL
1,489,058
MECHANICAL VERNIER
Original Filed July 24, 1915
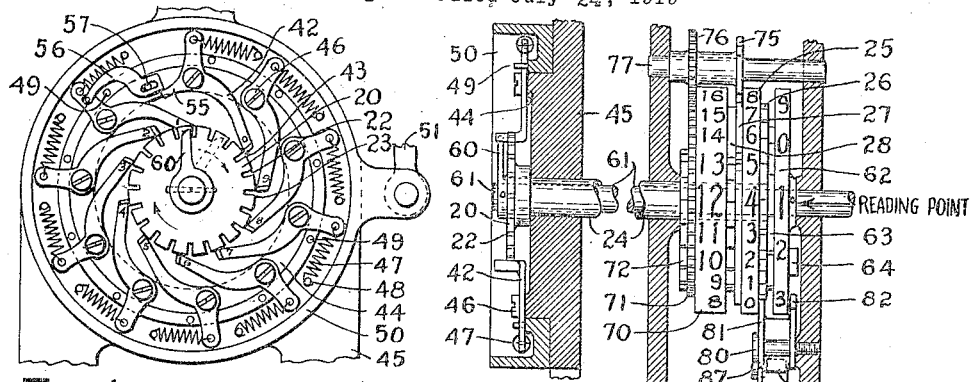
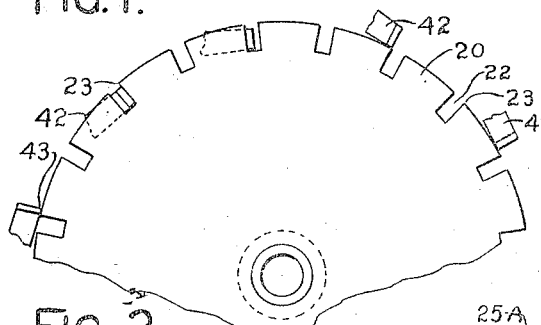
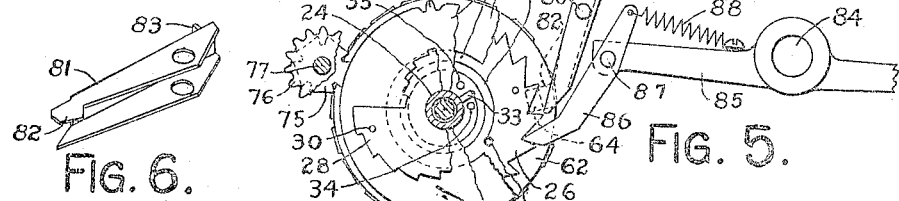
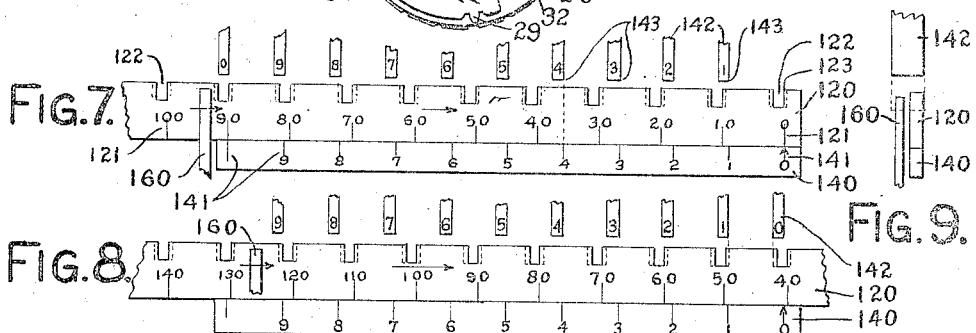
INVENTORS
Edith E. L. Boyer and
BY Frederick G. L. Boyer,
F. K. Fassett
ATTORNEY Patented Apr. 1, 1924.

1,489,058

UNITED STATES PATENT OFFICE.

EDITH E. L. BOYER AND FREDERICK G. L. BOYER, OF DAYTON, OHIO, ASSIGNORS, BY MESNE ASSIGNMENTS, TO DAYTON SCALE COMPANY, OF DAYTON, OHIO, A CORPORATION OF NEW JERSEY.

MECHANICAL VERNIER.

Original application filed July 24, 1915, Serial No. 41,667. Divided and this application filed April 10, 1920. Serial No. 372,792.

*To all whom it may concern:*

Be it known that we, EDITH E. L. BOYER and FREDERICK G. L. BOYER, residing at Dayton, in the county of Montgomery and State of Ohio, have invented a new and useful Mechanical Vernier, of which the following is a specification.

Our invention relates to any type of computing or measuring device in which the relative movement of two members, or their relative position as compared to a certain standard or zero position, is measured in any units of measurement designed to be expressed in figures representing units and figures representing higher denominations such as: millimeters, centimeters, etc.; fractions of inches, inches, etc.; minutes, and degrees of arc; cents, dimes, and dollars; pence, shillings, and pounds; ounces and pounds; minutes and hours of time; or the like. Throughout this specification the word "unit" is used to designate the smallest unit of measurement which it is desired to express, the fractions thereof being disregarded except as they help to determine what the units figure should be.

The present application is a division from our application filed July 24, 1915, Serial No. 41,667 now Patent No. 1,338,282, April 27, 1920.

The object of our invention is like that of the ordinary vernier, to make possible the accurate determination of units of relative movement that are too small to be determined directly with convenience. A further object of our invention is to facilitate reading or recording the value of said relative movement, to prevent mistakes, and to make familiarity with a vernier unnecessary for determining the reading. This is done by providing mechanism which will automatically determine the numerical value of the relative movement of the two members, i. e. the reading which would be given by the equivalent vernier.

In order to prevent mistakes in reading or recording the value of said relative movement, the mechanism is so arranged that it will set up the figures representing the aforesaid numerical value on type wheels for printing or on visual indicators or both, in such a manner that no figures are in a position for reading or printing except those actually needed to represent the correct reading. If the individual readings are not desired it is not necessary to provide said indicating or printing means but instead the mechanism may be connected directly to a totalizer, which would indicate merely the total of all readings, or it might be connected to other mechanism in such a way that the reading would control its action as might be desired.

To accomplish these objects we employ mechanical elements in place of the graduations on the scale and vernier. In the embodiment of our invention shown in the accompanying drawings we substitute (on one of the two relatively movable members) a series of notches for the graduations on the scale; and (on the other of the two relatively movable members) a series of pawls for the graduations on the vernier. When the relative motion between the two members ceases we press the series of pawls against the notched member allowing pawls to enter notches with which they register. The pawl which enters a notch is so arranged as to arrest the movement of the member which represents the units figure in the reading, is such a position as to expose the correct units figure at the point where the reading is taken. (This point will hereinafter be called the "reading point.") The figures of higher denomination are taken directly from the relative position of the two members, just as is the case in an ordinary vernier, but their determination is controlled by the pawl which determines the units figure.

The mechanism and its operation will be more easily understood by reference to the accompanying drawings in which:

Fig. 1. is a front view of our vernier showing the notched member and pawls in a position indicating a reading of one unit.

Fig. 2 is a sectional view of the same showing also the numeral bearing wheels, connected thereto, on which the reading is indicated.

Fig. 3 is an enlarged view showing a portion of the notched disk shown in Figs. 1 and 2, together with parts of the pawls in the positions which they occupy when the reading is half way between two units.

Fig. 4 is a detail view of the tens and units wheels, with part of the tens wheel broken away to show the internal construction, and of the justifying mechanism prior to its operation and after the operation of the units wheel to a position indicating nine units.

Fig. 5 shows the same after the justifying operation has taken place, and shows in addition certain parts attached to the tens wheel and part of the transfer mechanism not shown in Fig. 4.

Fig. 6 is a perspective view of the pilot pawl used in connection with the justifying mechanism.

Fig. 7 is a diagrammatic view of the mechanical vernier, with modifications adapting it to measure rectilinear instead of rotary motion.

Fig. 8 shows the same device with the zero pawl located to correspond more closely with the common vernier in the lower part of the figure, and with the relative position of the two members representing a movement of 40½ units from zero position.

Fig. 9 is an end view of the parts shown in Figs. 7 and 8.

Similar numerals refer to like parts in all of the views.

The arrangement of our invention illustrated in Figs. 7 and 8, where it corresponds to the simplest form of vernier—a rectilinear, direct, decimal vernier—shows the analogy most clearly and exhibits the principles of our invention most simply, and will first be described.

In Fig. 7 we have a bar or scale 120 which we will for the present consider as movable, the direction of movement shown by the arrow being considered as positive. Its movement is measured in units in the decimal system. Along the lower edge of this bar is a series of graduations 121 numbered 0, 10, 20, etc. Each of the spaces between these graduations represents ten units of movement. On the upper side of said bar or scale 120 is a series of notches 122. The right hand edges or corners 123 of these notches are cut so as to correspond exactly with the graduations 121. Just below bar 120 is a vernier 140, which we will for the present consider as stationary, and which carries a series of graduations 141. In this decimal vernier there are ten of these graduations numbered from 0 to 9, and since it is a direct vernier ten spaces on the vernier are exactly equal to nine spaces on the scale 120, as may be readily seen by referring to Fig. 7. (If it were a retrograde vernier ten spaces thereon would exactly equal eleven spaces on scale 120.) Thus one unit of movement of bar 120 will bring a graduation thereon opposite the one graduation on vernier 140, two units of movement will bring a graduation on bar 120 opposite the two graduation on vernier 140, and so on. Ten units of movement will bring the tenth graduation on bar 120 opposite the zero graduation on vernier 140, just as the zero graduation is seen in Fig. 7, and then one, two, three, etc. units of further movement will again bring a graduation on bar 120 opposite the 1, 2, 3, etc., graduation on vernier 140. The units figure in the vernier reading—which reading represents the numerical value of the relative movement between bar 120 and vernier 140—is thus determined by the graduation on vernier 140 which is most nearly opposite a graduation on scale 120, and the tens figure and figures of higher denomination in the reading are read from the first graduation on scale 120 to the right of the zero graduation on vernier 140. Thus in Fig. 8 the units value is seen to be between zero and one, and the tens is seen to be four, making the whole reading 40½ which, according to usual practice is called 41. So far we have simply described an ordinary vernier and the method in which the reading is determined. We shall now show how, in our device, we determine the same reading mechanically by substituting mechanical elements for the graduations on the vernier and scale, and providing mechanism for their operation.

Just above the bar 120 is mounted a stationary series of transversely slidable pawls 142, of which the right hand sides or corners 143 are located so as to correspond exactly with the graduations 141 on vernier 140, as indicated at graduation 4 in Fig. 7. The only difference between the arrangements shown in Figs. 7 and 8 is in the location of the zero pawl. A little consideration will show this difference to be of no importance except as it may affect the practical considerations in the design of connected parts.

By inspection of Fig. 7 it is seen that the vernier reading is zero and the zero pawl registers with a notch in bar 120. It will further be seen that by moving bar 120 one, two, three, etc., units of movement the vernier reading will be one, two, three, etc., units, and the one, two, three, etc., pawl will register with a notch in bar 120. Then to determine the vernier reading by means of our invention it is simply necessary to yieldingly press the series of pawls 142 against the notched bar 120 in such a manner that the pawl which registers with a notch will enter the notch while the others will be arrested by the top surface of the bar 120. After this is done the finger 160 is moved from the position shown, in the direction indicated by the arrow, until its movement is arrested by the pawl which has entered a notch. The way in which this occurs will be apparent from Fig. 9 in which the dotted lines indicate the position of one of the pawls 142 which has entered a notch, showing how it then obstructs the path of the finger 160. The position in which this finger 160 is arrested controls the indication of the units figure in the reading as will be explained later.

It will be noticed that in Figs. 7 and 8 the notches 122 are the same width as the pawls 142 and that unless the movement of the bar 120 can be exactly divided by the unit of measurement none of the pawls 142 will exactly register with any of the notches 122, and that none of them will enter notches when pressed against the bar 120. In order to provide for the arrest of finger 160, in whatever position the bar 120 may be, we cut away the sides of the notches 122 as shown by dotted lines in Figs. 7 and 8, so that it will always be possible for at least one pawl to enter a notch.

The common practice is to neglect fractions (of the smallest unit in which measurement is desired) which are less than one half unit, and when the fraction is equal to one half unit or more to count it as a full unit. To make the reading given by our device conform to this practice we cut away the sides of the notches 122 in the following manner, referring to Fig. 8 in which the bar 120 has moved just one half unit beyond the position representing exactly 40 units: At this point the reading should change from 0 units to 1 unit. If the bar 120 had stopped with the 40 graduation exactly opposite the zero graduation on vernier 140 the right hand side 143 of zero pawl 142 would register exactly with the right hand side 123 of the 40 notch 122, and since the pawl and notch are of the same width their left hand sides would also register exactly. At all points between this position and that shown in Fig. 8 the unit reading should be zero, and consequently the zero pawl should enter the notch. To make this possible the left hand side of the notch is cut away an amount equal to one half unit of movement, as shown by the dotted line. At the position shown in Fig. 8 the unit reading should change from zero to one, and consequently the one pawl should enter a notch. To make this possible the notch opposite the one pawl must have its right side cut away an amount equal to exactly one half unit, as shown by the dotted line. It will now be noticed that the reading finger 160 moves past the pawls in descending sequence so that when it is arrested by the one pawl it is immaterial whether or not the zero pawl is also in a notch. This fact makes it possible to cut away the left side of the notch slightly more than one half unit in order to be perfectly sure that in practice the zero pawl will continue to function until the one pawl begins to function. Continuing the same reasoning, we see that all notches need to be cut away an amount equal to exactly one half unit on the right hand side and an amount equal to one half unit plus clearance on the left hand side. This insures at least one pawl being in a position to arrest finger 160 no matter what the position of bar 120 may be.

If it is desired that the transition point between the consecutive unit readings be at some point other than half way between the whole units we simply cut away the right hand side of the notches more or less as desired, leaving the width of the notches in any case equal to the width of the pawl plus one unit plus clearance. The same result can be obtained by a simple adjustment of the zero position of the bar 120, because the factor which controls the location of the transition point is the relative position of the right hand side 143 of the zero pawl and the right hand side 123 of the notch which is opposite the zero pawl when the bar 120 is in its zero position, the width and spacing of notches being the same in any case.

Throughout the remainder of the description we will consider the sides of the notches cut away as described so that the transition point between two consecutive units in the reading comes midway between them. It will be noted that for a short distance on one side of this transition point two pawls may occupy notches simultaneously, while on the other side of said transition point only one pawl can occupy a notch.

From the foregoing description it will be seen that the reading is controlled by the forward sides or corners 123 of notches 122 and the corresponding sides or corners 143 of pawls 142, which will hereinafter be called the active or controlling edges or corners, the locations of the other sides of pawls and notches being merely a result of practical considerations of design. It will also be noticed that the active corners of the notches are the parts or elements of the mechanism which are spaced like the graduations on a scale, and the active corners of the pawls are the parts or elements of the mechanism which are spaced like the graduations on a vernier. Throughout this specification when the space between pawls or notches is mentioned it will be understood as referring to the space between the active edges or corners.

Bearing in mind the principles of our invention as described, the modifications involved in the embodiment thereof illustrated in Figs. 1 to 6 inclusive will be readily understood. The principal difference is that in this case our invention is adapted to measure rotary instead of rectilinear motion.

In Figs. 1, 2, and 3 the notched disk 20 is the equivalent of the bar or scale 120 in Figs. 7 and 8 and like it will for the present be considered as the movable member whose movement is to be measured in units in the decimal system. This disk carries a series of notches 22 with the active edges or corners 23 corresponding to the notches 122 and corners 123 in Figs. 7 and 8. Vernier pawls 42 correspond to pawls 142 and their active corners 43 correspond to corners 143 on the pawls 142 in Figs. 7 and 8. It will be noticed that the disk 20, in Fig. 1, carries twice as many notches 22 as there are pawls 42 but this fact may be ignored for the present. The pawls 42 are mounted on an annular boss 44 on frame 45, and instead of sliding vertically they are arranged to rock on studs 46. They are yieldingly pressed against disk 20 by means of springs 47 which are attached to pins 48 in a rocking ring 50 mounted on frame 45, concentric with disk 20, and boss 44. When disk 20 is to be rotated, the pawls 42 are removed from contact therewith by rocking the ring 50 in a counter-clockwise direction, thus releasing the tension on springs 47 and bringing pins 49 in ring 50 into contact with pawls 42 rocking them on studs 46 until they are out of contact with disk 20.

The finger 60 which is rigidly attached to shaft 61 corresponds to the finger 160 in Figs. 7 and 8. This finger normally stands, in Fig. 1, between the zero and one pawls as shown by the dotted line; and rotates in a clockwise direction, passing the pawls in descending sequence, until arrested by the pawl which has entered a notch. Fig. 1 shows the finger 60 as it has been arrested by the one pawl.

That the transition point between consecutive unit readings is controlled as already described will be apparent from Fig. 3. If, however, (see Fig. 1) the zero and one pawls simultaneously occupy notches the zero pawl would arrest the finger 60 which, in that case, should have been arrested by the one pawl. This slightly erroneous result—it never occurs except at the transition point between zero and one units, and never amounts to more than a very small fraction of a unit—is prevented by the arm 55 on the zero pawl and the link 56 pivoted to the one pawl and sliding on pin 57 in the boss 44 on frame 45. The pin 49 which lifts the one pawl off of disk 20 is set so as to allow the one pawl to drop into a notch before the other pawls have been dropped onto disk 20. This action of the one pawl throws link 56 into the path of arm 55 on the zero pawl and prevents the entrance of that pawl into a notch, thus permitting the finger 60 to pass the zero pawl and be arrested by the one pawl. If the one pawl is arrested by the surface of disk 20 and link 56 will not interfere with the operation of the zero pawl. Thus whenever two pawls are in a position to simultaneously occupy notches the higher of the two possible readings is always secured.

It will be noted that it is not essential that the finger 60 stand normally between the zero and one pawls, as any other position may be chosen to simplify the problems of design. It is only necessary that the link 56 and connections be placed between the same two pawls as the position chosen for the finger 60, and that the finger 60 rotate in the same direction. Even a reversal in direction would be possible if the function of link 56 were reversed and the opposite corners of pawls and notches were located so as to be the determining factors in the reading.

A connection analogous to link 56 may be placed between the zero and one pawls in Fig. 7 and between the zero and nine pawls in Fig. 8 where it will perform the same function as in Fig. 1.

If the disk 20 carried only ten of the notches 22 this form of vernier would measure one hundredth parts of a revolution and would be exactly equivalent to the one shown in Figs. 7 and 8 if the latter were formed into a circle. However, it will be noted that the disk 20 carries twenty notches and the units of measurement in this vernier are therefore each equal to one two-hundredth part of a revolution of the disk. The disk 20 might be provided with 30, 40, 50, or more equally spaced notches to increase the number of units of measurement to 300, 400, 500, or more per revolution of the disk. With 20, 30, 40, or 50 notches in the disk the ten vernier pawls would be located within the space of one half, one third, one fourth, or one fifth of a circle if they were spaced like those in Figs. 7 and 8. This would not be a convenient arrangement in the case illustrated for sveeral reasons, especially if the number of pawls were 30, 40, or more, as it would require the pawls to be spaced too close together and would seriously decrease the movement per unit of the finger 60 and the shaft 61.

To avoid these difficulties the space between adjacent pawls in the series, in Fig. 1, is made 19/10 of the space between adjacent notches, instead of 9/10 as in Figs. 7 and 8. If there were 30, 40, or 50 notches around the disk 20 the spacing of the pawls would be 29/10, 39/10, or 49/10 respectively of the distance between adjacent notches in the disk 20. Although not common, verniers graduated in a manner similar to this have occasionally been used on some instruments. On a little consideration it will be apparent that this change in the usual vernier spacing will not affect the results obtained, for the determining factor is the pawl that enters a notch, the notch that it enters being immaterial. The essential feature of the spacing is the number of units remaining in the space between consecutive pawls after the largest possible multiple of the space between consecutive notches has been subtracted therefrom. Thus it will be seen that, though it is convenient, it is not necessary that the spaces between the pawls in the series be uniform.

It is evident that the same principle of spacing the pawls can be used in the rectilinear verniers shown in Figs. 7 and 8 if it is desired to make the units of measurement so small that the pawls would be spaced too close together when spaced as shown in those figures. It will be noticed that when the uniformly spaced series of pawls used in the rectilinear vernier are formed into a circular series as shown in Fig. 1 the space remaining where the pawls on opposite ends of the series become adjacent is not equal to the uniform spaces between adjacent pawls within the series. Such a space is shown between the zero and one pawls in Fig. 1 where it is equal to 29/10 of the space between consecutive notches instead of 19/10.

Having described the action of our vernier in determining the units figure in the numerical value of the relative movement of two members, we will now describe the method by which the figures representing the complete reading are brought into alignment at the reading point, and the way in which the selection of the figures of higher denomination is controlled by the units figure as determined by our vernier.

In Fig. 2 it is seen that the shaft 61, to which finger 60 is rigidly fastened, carries a numeral bearing wheel 62, at its opposite end. The numerals thereon are so arranged that when finger 60 is arrested by one of the pawls 42 the corresponding numeral on wheel 62 will be exposed at the reading point. In Figs. 1 and 2 this numeral is seen to be 1.

In Fig. 2 it will also be seen that the notched disk 20 is rigidly attached to a tube or sleeve 24, which surrounds and forms a bearing for shaft 61, and carries at its opposite end a numeral bearing wheel 25, contiguous to the units wheel 62. The numerals on the wheel 25 represent tens and there will obviously be as many of these as there are notches in disk 20. In the arrangement shown there are two complete sets of numerals around the wheel—twenty in all. This wheel turns with disk 20 and measures its movement directly. The method by which the proper numeral thereon is brought into alignment at the reading point will be described presently.

It will be noted that, attached to the side of wheel 25, there is a transfer gear 27 (see also Fig. 5) with two teeth 29 (one for each series of numerals on wheel 25) which cooperate with a star wheel 75 and pinion 76 mounted on shaft 77 to turn wheel 70 by means of gear 71 attached thereto. Wheel 70 carries numerals representing hundreds. This mechanism is so arranged that each time the movement of wheel 25 indicates a change in the value of the hundreds figure one of the teeth 29 on the transfer gear 27 passes star wheel 75 and turns wheel 70 to expose a different figure to represent hundreds in the reading.

In the device illustrated the whole capacity is not desired to be greater than 1,999 (ten revolutions of disk 20) and a series of numbers from 0 to 19 on the hundreds wheel is sufficient for the purpose. If a higher capacity were desired it would simply be necessary to number the hundreds wheel like the tens wheel 25 and provide it with a transfer gear like 27 to transfer to a thousands wheel. In this manner the capacity can be increased indefinitely.

It is evident that unless the movement of sleeve 24 and disk 20 amounted to exactly 10, 20, 30, etc., units the figures on wheel 25 would not be in alignment at the reading point if the wheel 25 were rigidly attached to sleeve 24 and disk 20. In fact, in some instances the correct figure would be so far out of alignment as to make it almost impossible to tell which the correct figure might be. To prevent this and to bring the correct numeral on wheel 25 into proper position we provide what we call "justifying mechanism" because its function is somewhat analogous to what printers call "justifying." This mechanism imparts a forward movement to wheel 25 (and when necessary through the transfer mechanism to the hundreds wheel 70) sufficient to bring the correct numeral into position.

In order that this forward movement may take place the wheel 25 is loosely mounted on the sleeve 24 and is normally located so that when sleeve 24 and disk 20 are in zero position, the figure 9 on wheel 25 is in reading position, and when said sleeve and disk are in a position representing any number of even tens of units of movement the figure in reading position is one less than the required figure. At such a time the justifying mechanism must impart forward movement to the wheel 25 equal to ten units of movement of disk 20. (It should be noted here that the figures on wheel 25 and the notches on disk 20 are ten units of movement apart.) When sleeve 24 and disk 20 are in a position representing a certain number of odd units in addition to the even tens, the justifying mechanism is only required to move wheel 25 an amount equivalent to the difference between said number of odd units and ten units of movement of disk 20.

For example, if sleeve 24 and disk 20 are in a position representing 40 units the figure 3 on tens wheel 25 would be exposed at the reading point, and the justifying mechanism would be required to move the wheel 25 forward ten units of movement to bring the tens figure 4 into position. If sleeve 24 and disk 20 have been brought to a position representing 44 units they have carried the tens wheel 25 four units of movement beyond the figure 3 or 4/10 of the distance from 3 to 4 and the justifying mechanism is only required to move it forward six units of movement in order to bring the tens figure 4 into position. If sleeve 24 and disk 20 are in a position representing 49 units they have carried the tens wheel 25 nine units of movement beyond the figure 3 or 9/10 of the distance from 3 to 4 and the justifying mechanism is then required to move the wheel 25 only one unit of movement to bring the tens figure 4 into position. If, however, said sleeve and disk were in a position representing 49½ units the zero vernier pawl 42 would just enter a notch in disk 20 changing the units figure from 9 to 0, and the tens figure should therefore change from 4 to 5. In this case the sleeve 24 will have carried the tens wheel 25 to a position where the figure 4 is within one half unit of the reading point, and the justifying mechanism will then be required to move the wheel 25 forward 10½ units of movement to bring the tens figure 5 into position at the reading point.

The arrangement of the mechanism for this purpose is as follows: (see Figs. 2, 4, and 5) On one side of numeral bearing wheel 25 is a ratchet wheel 26, having one tooth for each figure on wheel 25. On the other side of wheel 25 is the transfer gear 27 already described and the stepped wheel 28 whose function will be described later. These wheels 25, 26, 27, and 28 are rigidly fastened together by rivets 30. The central portion of the wheel 25 is cut out forming a circular opening 25$^A$ which contains spiral spring 31 attached at one end to pin 32 which is carried by wheel 26 and at the other end to an arm 33 projecting from sleeve 24. This spring normally pulls wheel 25 in a counter-clockwise direction so that pin 34 fastened thereto is held against the arm 33 as shown in Fig. 4. The motion of wheel 25 against the tension of spring 31 is limited by pin 35. This pin 35 is a mere safeguard and has no function in the normal operation of the mechanism.

The necessary forward movement is imparted to the tens wheel 25 by means of the ratchet 26 attached thereto and the justifying pawl 86 mounted on a stud 87 in the arm 85. (See Fig. 5). This arm is arranged to rock on a fixed center 84 and each time a reading is to be taken it is rocked to the fixed position shown in Fig. 5. When in this position it holds the ratchet 26 in such a position that one of the figures on wheel 25 is in position at the reading point, the spiral spring 31 holding one of the teeth in ratchet 26 against the pawl.

In the typical example just cited it will be seen that, when the actual value of the units figure is less than 9½ and the vernier pawl 42 representing 9 units controls the unit indication, the forward movement imparted to the ratchet 26 by justifying pawl 86 should be but slightly more than one half unit and therefore the pawl 86 should not fall behind that tooth on the ratchet which would cause it to bring the figure 5 on tens wheel 25 to the reading point. When the actual value of the units figure is 9½ units or over and the zero vernier pawl 42 begins to act, the justifying pawl 86 should fall behind that tooth on ratchet 26 which will cause it to bring the figure 5 on tens wheel 25 to the reading point.

As the justifying pawl 86 is mounted on a movable center 87 it would be almost imposible to cause it to drop behind the tooth representing 5 tens at the exact time that the zero vernier pawl 42 begins to control the reading in place of the nine pawl. To better control the point where the pawl 86 begins to engage each succeeding tooth on ratchet 26 we provide a pilot pawl 81 (see also Fig. 6) mounted on a fixed center 80, which pawl also cooperates with ratchet 26. When justifying pawl 86 is moved upward to its normal position, shown in Fig. 4, it rides up over the pilot pawl 81, and at the top of its motion arm 85 strikes projection 83 on the pilot pawl rocking it, and with it the justifying pawl, out of engagement with ratchet 26. When justifying pawl 86 in moved downward preparatory to taking a reading it rides downward over the pilot pawl 81 and is thereby piloted behind or over one of the teeth on ratchet 26 according to whether or not the pilot pawl has dropped behind the tooth.

By extremely accurate workmanship it might be possible to cause the pilot pawl to drop behind the tooth representing 5 tens (referring to the example cited) at the exact point where the zero vernier pawl 42 begins to control the unit reading in place of the nine pawl. If the workmanship were not sufficiently accurate the pilot pawl might drop, and pilot the justifying pawl, behind the tooth while the reading remained 9, giving a reading of 59 where it should be 49. If it failed to drop, and pilot the justifying pawl, behind the tooth when the zero vernier pawl 42 begins to control the unit reading, it would cause a reading of 40 where it should be 50.

To prevent such errors and eliminate the necessity for extremely accurate workmanship, we provide means whereby the pilot pawl is controlled by the same one of the vernier pawls 42, which controls the unit reading. To do this we cut the pilot pawl slightly shorter than it theoretically should be and thus make it certain to drop behind that tooth on ratchet 26 behind which it should pilot the justifying pawl. To prevent the pilot pawl from dropping behind the tooth prematurely we cause the units wheel to operate to position before the justifying operation begins, and provide a block 64 attached to the units wheel 62 in such a position that when the nine vernier pawl 42 has arrested the units wheel in a position representing nine units the block 64 is in the path of the foot 82 on the pilot pawl 81, (see Figs. 2, 5, and 6) and prevents it from dropping behind the tooth even though it no longer rests on the point of the tooth, as may be seen in Fig. 5. When the unit reading changes from 9 to 0 the tens reading should also change, and this change it caused at this time by the fact that when the zero vernier pawl 42 has arrested the units wheel in a position representing zero units, the block 64 is not under the foot 82 on pilot pawl 81 and does not prevent it from dropping, and piloting the justifying pawl, behind the next tooth in ratchet 26. Thus, in the example cited, when the zero vernier pawl 42 begins to control the unit reading the pawl 81 pilots the justifying pawl 86 behind the 5 tooth on ratchet wheel 26 and the pawl 86 turns the wheel 25 forward, against the tension of spring 31, to a position indicating 5 tens.

If the units of measurement were made much smaller by greatly increasing the number of notches in the disk 20 it might be necessary to extend block 64 so it would function, not only when wheel 62 is in a position representing nine units, but also 8 and perhaps even 7, 6, and 5 as well, in order to make extreme accuracy of workmanship unnecessary.

Thus it is that, through its control of the position of units wheel 62, the vernier pawl 42 which controls the unit reading also controls the figures of higher denomination, because the unit value represented by that pawl determines whether the block 64 causes pawl 81 to pilot pawl 86 into one tooth or allows it to drop into the succeeding tooth.

The stepped wheels 63, 28, and 72 are attached to the sides of the units wheel 62, the tens wheel 25, and the hundreds wheel 70, respectively. These are for the purpose of transferring the reading to other mechanism such as large indicators, a totalizer or the like. The mechanism for this purpose does not form a part of the present invention and is not shown in this case, but one form is shown in our application Serial No. 41,667, filed July 24, 1915.

Likewise the mechanism for operating the ring 50 which controls the vernier pawls 42, the arm 85 which controls the justifying mechanism, and the units wheel 62, as well as that for moving the disk 20 and sleeve 24, do not form a part of the present invention and are not here shown.

From the analogy with an ordinary vernier it is apparent that our device is as elastic and as adaptable to various uses under various conditions and in various arrangements as is the vernier itself. For example: We have seen that it may be straight or curved and may occupy a full circle or only an arc; it may be compressed as in Figs. 7 and 8 or it may be extended so that spaces between pawls are equal to many times the space between adjacent notches in addition to the usual vernier spacing. We have already referred to the fact that the spacing of a direct or retrograde vernier may be used, and that the vernier spacing may or may not be uniform. The pawls may also be spaced to represent the units in any order desired as well as the natural order illustrated in the drawings. It is also evident that the series of pawls may begin with the one pawl as in Fig. 7 or the zero pawl as in Fig. 8 or with any other unit. It is easily seen that the units of movement need not be in the decimal system, as common fractions, English monetary units, degrees and minutes of arc, hours and minutes of time, or any other system of units can be used by properly spacing the pawls and notches. Although we have regarded the notched member as the movable member it is quite evident that it could be stationary and the pawl carrying member movable, or both might be movable, as might be desired in any particular case. Although we have shown notches spaced like graduations on a scale and pawls spaced like graduations on a vernier it is quite possible to reverse that arrangement. Such a reversal might be of advantage on some adaptations of our invention. It is also evident that the pawls may rock or slide in any manner and be of any form and be actuated by any means suitable to the particular adaptation contemplated. It is not even necessary that pawls and notches be used as equivalent elements may be substituted.

We have only mentioned a few of the possible variations in structure and application of our invention. Many other modifications might be made by those skilled in the art within the scope of the appended claims.

What we claim is as follows:

1. A mechanical vernier comprising in combination, two relatively movable members, cooperating vernier means controlled by the relative position of said members, and indication-producing means controlled by said vernier means.

2. A mechanical vernier comprising in combination, two relatively movable members whose relative position is to be determined, cooperating vernier means controlled by the relative position of said members, an indicia-bearing device controlled by relative displacement of said members, and a second indicia-bearing device controlled by said vernier means.

3. A mechanical vernier comprising in combination, two relatively movable members whose relative position is to be determined, cooperating vernier means controlled by the relative position of said members, and a number-wheel controlled by said vernier means.

4. A mechanical vernier comprising in combination, two relatively movable members, cooperating vernier means controlled by the relative position of said members, a number-wheel controlled by relative displacement of said members, and a second number-wheel controlled by said vernier means.

5. A mechanical vernier comprising in combination, two relatively movable members whose relative position is to be determined, cooperating vernier means controlled by the relative position of said members, a number-wheel actuated by one of said members, and a second number-wheel controlled by said vernier means.

6. A mechanical vernier comprising in combination, two relatively movable members whose relative displacement is to be determined, cooperating vernier means controlled by the relative position of said members, and means controlled by said vernier means for producing an indication of the relative displacement of said members.

7. In combination: two relatively movable members; one carrying a series of notches and the other carrying a series of pawls, which are adapted to enter said notches; and means for determining the relative position of said members, said means being controlled by one of said pawls which has entered a notch.

8. In combination: two relatively movable members; and means for mechanically measuring their relative movement, comprising: a series of notches carried by one, a series of pawls carried by the other, means for causing pawls to enter notches with which they register, and means for determining which pawl has entered a notch.

9. In combination: two relatively movable members; a series of notches, spaced like uniform graduations on a scale, carried by one; a series of pawls, spaced like graduations on a vernier, carried by the other; and means for causing pawls to enter notches with which they register.

10. In combination: two relatively movable members; a series of notches, spaced like uniform graduations on a scale, carried by one; a series of pawls, spaced like graduations on a vernier, carried by the other; means for causing pawls to enter notches with which they register; and means for determining which pawl has entered a notch.

11. In a computing device: a mechanical vernier, comprising a member having a series of notches corresponding to graduations on a scale, a member carrying a series of pawls corresponding to graduations on a vernier, said members being so associated that one or another of the pawls may enter a notch according to the relative positions of the members.

12. In a mechanical vernier: two relatively movable members, the first carrying a series of notches, the second carrying a series of pawls; means for causing pawls to enter notches with which they register; mechanism for determining units and figures of higher denomination in the reading, controlled by a pawl which has entered a notch.

13. A mechanical vernier, comprising: a member carrying a series of uniformly spaced notches; a member carrying a series of vernier pawls adapted to enter notches with which they register; means for determining the units figure in the reading, controlled by a pawl which has entered a notch; means whereby the aforesaid mechanism may control the figures of higher denomination in the reading.

14. A mechanical vernier, comprising: two relatively movable members, one member carrying a series of uniformly spaced notches, the other member carrying a series of pawls, so spaced that each unit of relative movement between the two members will make another pawl register with a notch; and mechanism for determining which pawl registers with a notch.

15. A mechanical vernier, comprising: a member carrying a series of notches; another member carrying a series of pawls representing units, so spaced that the pawl which represents the units figure in the reading will register with a notch; and mechanism for determining which pawl registers with a notch.

16. In a mechanical vernier: two relatively movable members, one member carrying a series of notches corresponding to graduations on a scale; the other member carrying a series of pawls corresponding to graduations on a vernier; and mechanism for determining which pawl represents the figure nearest to the correct reading.

17. In a mechanical vernier: a notched member; another member carrying a series of pawls representing units, so arranged that the pawl representing the units figure in the reading will drop into a notch; means for controlling the point of transition between two consecutive readings by allowing two pawls to simultaneously occupy notches on one side of said transition point.

18. In a mechanical vernier: a notched member; another member carrying a series of pawls representing units, so arranged that the pawl representing the units figure in the reading will drop into a notch; means for allowing two pawls to simultaneously occupy notches when the reading is half way between two units; and means for causing the pawl representing the higher value to control the reading in that case.

19. In a mechanical vernier: two relatively movable members, one member carrying a series of notches, the other member carrying a series of vernier pawls so arranged that the one representing the units figure in the reading is adapted to enter a notch; and reading mechanism controlled by a pawl which has entered a notch.

20. In a mechanical vernier: two relatively movable members, one member carrying a series of notches, the other member carrying a series of vernier pawls so arranged that the pawl representing the units figure in the reading is adapted to enter a notch; reading mechanism controlled by a pawl which has entered a notch; means for causing two pawls to simultaneously occupy notches when the exact reading is midway between two units; and means for causing the pawl representing the higher value to control the reading mechanism in that case.

21. In a mechanical vernier: two relatively movable members; a series of notches on the one; a series of pawls, representing units in the reading, on the other; means for causing a pawl to enter a notch; means for causing two pawls to enter notches when the reading is midway between two units; a member adapted to pass the unit pawls in descending sequence and be arrested by a pawl which has entered a notch; and means for preventing one of two particular pawls in the series from entering a notch, when from the relative position of said members, both pawls might enter notches.

22. In a measuring device: a rotatable notched disk; pawls mounted contiguous thereto; and means for measuring the rotation of the disk, comprising mechanism for determining the units figure in the measurement, controlled by a pawl which registers with a notch.

23. In a measuring device: a rotatable notched disk; a series of pawls mounted contiguous thereto; means for measuring the rotation of the disk, comprising: a movable member, for determining the units figure in the measurement, controlled by a pawl in the series which registers with a notch; mechanism for determining the figures of higher denomination; and means whereby the pawl which controls said member also controls said mechanism.

24. A mechanical vernier, comprising: a rotatable notched disk; a series of pawls mounted contiguous thereto; means for determining the units figure in the reading, comprising means for causing pawls to enter notches which register therewith, and a movable member controlled by a pawl which has entered a notch.

25. A mechanical vernier, comprising: a rotatable notched disk; a series of pawls mounted contiguous thereto; means for determining the units figure in the reading, comprising means for causing pawls to enter notches which register therewith, means for causing two pawls to occupy notches simultaneously at the point of transition between two consecutive unit readings, and a movable member controlled by a pawl which has entered a notch.

26. A mechanical vernier, comprising: a rotatable notched disk; a series of pawls mounted contiguous thereto; means for determining the units figure in the reading, comprising means for causing pawls to enter notches which register therewith, means for causing two pawls to occupy notches simultaneously at the point of transition between two consecutive unit readings, a movable member controlled by a pawl which has entered a notch, and means for causing the proper one of these two pawls to control said member.

27. A mechanical vernier, comprising: a rotatable notched disk; a series of pawls mounted contiguous thereto; means for determining the units figure in the reading, comprising means for causing pawls to enter notches which register therewith, means for causing two pawls to occupy notches simultaneously at the point of transition between two consecutive unit readings, a movable member controlled by a pawl which has entered a notch, and means for causing the proper one of these two pawls to control said member, including means for preventing the two pawls adjacent to the normal position of said member from occupying notches simultaneously.

EDITH E. L. BOYER.
FREDERICK G. L. BOYER.